United States Patent
Talin et al.

(10) Patent No.: US 6,290,564 B1
(45) Date of Patent: Sep. 18, 2001

(54) METHOD FOR FABRICATING AN ELECTRON-EMISSIVE FILM

(75) Inventors: Albert Alec Talin, Scottsdale; Bernard F. Coll, Fountain Hills; Kenneth A. Dean, Phoenix; James E. Jaskie, Scottsdale; Emmett Howard, Gilbert, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/408,699

(22) Filed: Sep. 30, 1999

(51) Int. Cl.$^7$ ..................................... H01J 9/02
(52) U.S. Cl. ................................. 445/50; 445/58
(58) Field of Search ................. 445/24, 50, 58

(56) References Cited

U.S. PATENT DOCUMENTS

| | | | |
|---|---|---|---|
| 5,623,180 | 4/1997 | Jin et al. | 313/310 |
| 5,648,699 | 7/1997 | Jin et al. | 313/309 |
| 5,681,196 | 10/1997 | Jin et al. | 445/24 |
| 5,698,934 | 12/1997 | Jin et al. | 313/309 |
| 5,773,834 | 6/1998 | Yamamoto et al. . | |
| 5,796,211 | 8/1998 | Graebner et al. . | |

FOREIGN PATENT DOCUMENTS

| | | |
|---|---|---|
| 0905737 | 3/1999 | (EP) . |
| 2308495 | * 6/1997 | (GB) . |
| 2332089 | 6/1999 | (GB) . |
| 1022313 | 8/1998 | (JP) . |
| 9642101 | 6/1996 | (WO) . |
| 9642101 | 12/1996 | (WO) . |
| 9816577 | 5/1997 | (WO) . |

* cited by examiner

Primary Examiner—Kenneth J. Ramsey
(74) Attorney, Agent, or Firm—Kevin D. Wills; William E. Koch

(57) ABSTRACT

A method for fabricating an electron-emissive film (100) includes the steps of providing a powder (124), which has a plurality of carbon nanotubes (104); providing a substrate (102), a surface (103) of which defines a plurality of interstices (107); and dry spraying powder (124) onto surface (103) of substrate (102). The adjustable parameters of the dry spraying step include a separation distance of a spray nozzle (120) from surface (103), a spray angle between a spray (121) and surface (103), and a nozzle pressure at an opening (123) of spray nozzle (120).

The separation distance, spray angle, and nozzle pressure are selected to achieve, for example, uniformity of electron-emissive film (100) and adhesion of carbon nanotubes (104) to substrate (102). They can also be selected to achieve a perpendicular orientation of a length-wise axis (105) of each of carbon nanotubes (104) with respect to surface (103) and to achieve the break down of aggregates of carbon nanotubes (104), so that carbon nanotubes (104) are deposited on substrate (102) substantially as individually isolated carbon nanotubes (104).

19 Claims, 2 Drawing Sheets

METHOD FOR FABRICATING AN ELECTRON-EMISSIVE FILM

FIELD OF THE INVENTION

The present invention relates, in general, to methods for fabricating electron-emissive films, and, more particularly, to methods for fabricating a carbon nanotube film.

BACKGROUND OF THE INVENTION

Electron-emissive films are known in the art. For example, it is known to use a diamond film as an electron source. Emissive diamond films are typically formed by chemical vapor deposition. However, the uniformity of the electron emission of these prior art films is often poor.

It is also known in the art to fabricate an electron-emissive film by applying diamond particles to a metal foil. An example of this prior art method is described in U.S. Pat. No. 5,648,699, entitled "Field Emission Devices Employing Improved Emitters on Metal Foil and Methods for Making Such Devices", by Jin et al. Jin et al describe the deposition of emissive particles by utilizing a wet spray-coating method, electrophoretic deposition, or sprinkling through a fine sieve. Jin et al teach that the step for depositing the emissive particles is distinct from the step for bonding them to the metal foil. Jin et al further teach that use of a wet spray-coating method requires mixing the particles with a liquid medium and further requires a drying step subsequent to the deposition of the liquid mixture.

However, emissive particles in liquid solution may form aggregates, which result in poor uniformity of emission properties of the final film. Furthermore, if the drying step results in incomplete drying, the emission properties of the film can be compromised.

Another method for fabricating an electron-emissive film is described in published international application number WO 96/42101, entitled "Electron Source and Applications of the Same", by DeHeer et al, having an international filing date of Jun. 11, 1996. DeHeer et al teach a method for fabricating a carbon nanotube film, which includes the steps of mixing a nanotube-containing carbonaceous material in a liquid solvent, filtering the suspension, drying the filtered solids, and then transferring the filtered solids to a Teflon film. However, it is known that nanotubes dissolved in a liquid solvent tend to aggregate and agglomerate. A film formed from such aggregates tends to have poor uniformity of electron emission properties. Furthermore, the multiplicity of steps results in added costs and decreased yield.

Accordingly, there exists a need for a method for fabricating an electron-emissive film, which overcomes at least these shortcomings of the prior art.

Brief Description of the Drawings

Referring to the drawings.

Figure 1:
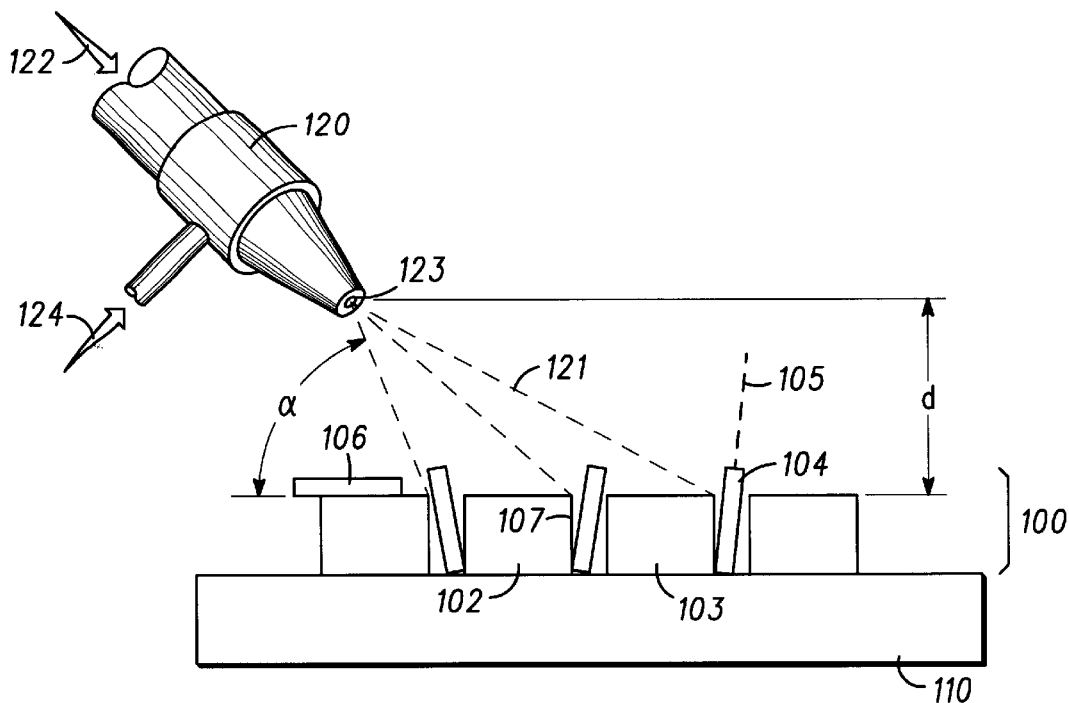
FIG. 1 is a cross-sectional view illustrating a preferred embodiment of an electron-emissive film fabricated in accordance with the method of the invention.

It will be appreciated that for simplicity and clarity of illustration, elements shown in the drawings have not necessarily been drawn to scale. For example, the dimensions of some of the elements are exaggerated relative to each other. Further, where considered appropriate, reference numerals have been repeated among the drawings to indicate corresponding elements.

Description of the Preferred Embodiments

The invention is for a method for fabricating an electron-emissive film and a field emission device, which includes the electron-emissive film. In accordance with the invention, the method for fabricating an electron-emissive film includes the steps of providing a powder having an emissive material and dry spraying the powder onto a porous substrate. The parameters of the dry spraying are selected so that the emissive material is anchored within the porous substrate upon deposition. They are also selected so that aggregates or agglomerates of the emissive material are broken apart to facilitate uniform deposition of the emissive material onto the surface of the substrate.

Because the emissive material is embedded into the substrate upon deposition, no additional adhesion step is required. In particular, no additional high-temperature adhesion step is required. Furthermore, by obviating the need for a liquid carrier during the deposition step, the method of the invention does not compromise the surface chemistry of the emissive material, which compromise may otherwise occur due to interaction with the liquid carrier. The method of the invention also thereby reduces the number of drying steps, each of which presents the risk of incomplete drying and, thus, inferior emission properties of the film.

FIG. 1 is a cross-sectional view illustrating a preferred embodiment of an electron-emissive film 100 fabricated in accordance with the method of the invention. The method of the invention includes the steps of providing a powder 124 having an emissive material, providing a substrate 102, and dry spraying powder 124 onto substrate 102.

In the example of FIG. 1, substrate 102, which defines a surface 103, is formed on a back plate 110. Back plate 110 is made from a hard material, such as glass, silicon, and the like. In general, substrate 102 has characteristics that allow an emissive material 104 to become anchored at surface 103 when it is deposited by dry spraying. For example, substrate 102 of FIG. 1 has a surface 103 that defines a plurality of interstices 107.

In accordance with the invention, the parameters of the dry spraying step are preferably selected to cause adhesion of emissive material 104 within interstices 107. By adhesion it is meant that emissive material 104 cannot be easily removed, such as by rinsing with water or dusting with a cloth.

Alternatively, substrate 102 can have a columnar microstructure, which defines depressions or wells at surface 103. A columnar microstructure can be made by depositing an evaporated metal at an incident flux angle within a range of about 60–75 degrees with respect to the deposition surface. Preferably, substrate 102 is a porous metal. Most preferably, substrate 102 is porous aluminum. The porous aluminum can be made by depositing evaporated aluminum onto a cold surface.

Subsequent to the step of providing substrate 102, powder 124, which contains emissive material 104, is dry sprayed onto substrate 102. As further illustrated in FIG. 1, the dry spraying is performed using a spray nozzle 120. To propel powder 124 through spray nozzle 120, a pressurized carrier gas 122 is fed into spray nozzle 120. Carrier gas 122 is pressurized by using a compressor (not shown), which is connected to spray nozzle 120. Preferably, emissive material 104 is a plurality of carbon nanotubes, and carrier gas 122 is nitrogen gas. The method of the invention is not limited to carbon nanotubes. For example, the emissive material can be a plurality of metal whiskers.

The mixture of carrier gas 122 and powder 124 exit from an opening 123 of spray nozzle 120 to form a spray 121. Spray nozzle 120 is characterized by a nozzle pressure, which is the pressure at opening 123.

Nanotubes are available commercially in the form of sheets of carbon soot. To provide powder 124 a portion of such a sheet can be ground using a convenient grinding method. It is desired to separate individual carbon nanotubes, such that they are not attached to one another. However, the grinding process may yet result in large particles. Some of these particles can be removed by sifting. Subsequent to the sifting step, however, aggregations of carbon nanotubes may still remain in powder 124.

The method of the invention employs a high-pressure spraying step to facilitate the break down of these aggregations. In particular, the nozzle pressure can be selected to achieve optimal particle separation. When carbon nanotubes are employed, the method of the invention facilitates the deposition of individual emissive carbon nanotubes, which are not attached to one another. The individual carbon nanotubes are readily anchored into the interstices or other receptive structures on the surface of the substrate.

Furthermore, a larger fraction of the carbon nanotubes can be properly oriented if they exist as individual, free structures. For example, if carbon nanotubes are employed, it is preferable that they be deposited as individually isolated nanotubes. It is preferable that a length-wise axis 105 of each of the nanotubes be about perpendicular to surface 103 of substrate 102. This orientation is preferred because emission occurs at the ends of the structure, when a proper potential is applied thereto. The anode structure (not shown) that receives the emitted electrons preferably directly opposes surface 103. Thus, preferably the emissive ends of the carbon nanotubes directly oppose the anode structure. However, the receiving area of the anode structure may allow some tolerance in the angle between length-wise axis 105 and surface 103. The phrase "about perpendicular" is meant to include this tolerance.

As further illustrated in FIG. 1, spray nozzle 120 is disposed to define a separation distance, d, from surface 103 of substrate 102 and to further define a spray angle, α, between spray 121 and surface 103. At least the variables of nozzle pressure, separation distance, and spray angle can be selected to achieve one or more results. For example, they can be manipulated to provide uniformity of electron-emissive film 100 and/or to provide the preferred orientation of emissive material 104 with respect to surface 103. They can also be manipulated to achieve a desired extent of adhesion of emissive material 104 to substrate 102.

For the deposition of carbon nanotubes, the nozzle pressure is preferably equal to about $3.45 \times 10^5$ Pascals; separation distance, d, is preferably equal to about 10 centimeters; and the spray angle, α, is preferably equal to about 90 degrees.

In accordance with the invention, powder 124 can further include a silicon carbide. The silicon carbide is added to facilitate the break down of the aggregations and/or agglomerations of the emissive material.

Preferably, the method of the invention further includes, subsequent to the step of dry spraying powder 124 onto substrate 102, the step of removing loose powder 106 from substrate 102. This step can be achieved by, for example, directing a stream of carbon dioxide particles onto surface 103 of substrate 102. One of the benefits of employing carbon dioxide for this step is that any residual carbon dioxide is subsequently removed by sublimation.

Figure 2:
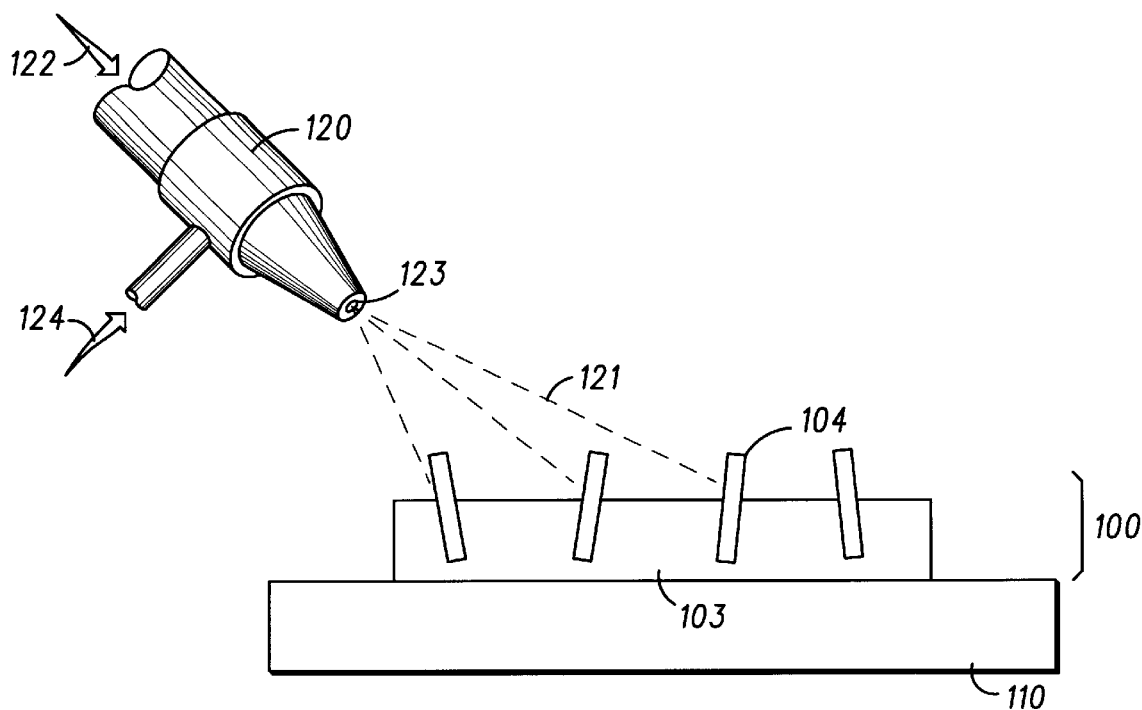
FIG. 2 is a cross-sectional view illustrating another embodiment of an electron-emissive film fabricated in accordance with the method of the invention.

FIG. 2 is a cross-sectional view illustrating another embodiment of electron-emissive film 100 fabricated in accordance with the method of the invention. In the embodiment of FIG. 2, substrate 102 of electron-emissive film 100 is made from a sol gel. Preferably, upon solidification, the sol gel provides a conductive layer.

In accordance with the method of the invention, electron-emissive film 100 of FIG. 2 is made by first depositing the sol gel onto back plate 110. While the sol gel is still wet, powder 124 is dry sprayed onto the sol gel. The parameters of the dry spraying step are selected to achieve, among other things, the desired orientation of emissive material 104 with respect to surface 103, the desired depth of penetration of emissive material 104 into substrate 102, and a uniform distribution of emissive material 104 on surface 103. Subsequent to the step of dry spraying, the sol gel is allowed to dry and solidify.

Figure 3:
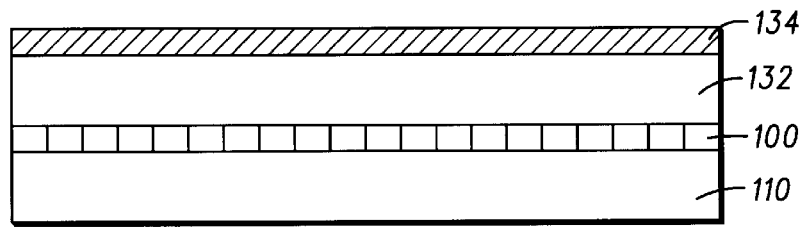
FIG. 3 is a cross-sectional view of a structure realized after performing selected steps of the method of the invention for fabricating a field emission device.

FIG. 3 is a cross-sectional view of a structure realized after performing selected steps of the method of the invention for fabricating a field emission device. To fabricate the structure of FIG. 3, first, electron-emissive film 100 is formed on back plate 110, in the manner described with reference to FIG. 1 or FIG. 2.

Thereafter, a dielectric layer 132 is deposited on electron-emissive film 100. Dielectric layer 132 can be, for example, silicon dioxide or silicon nitride. Subsequent to the step of depositing dielectric layer 132, a conductive layer 134 is deposited on dielectric layer 132. Conductive layer 134 is made from a convenient conductor, such as, for example, molybdenum.

Figure 4:
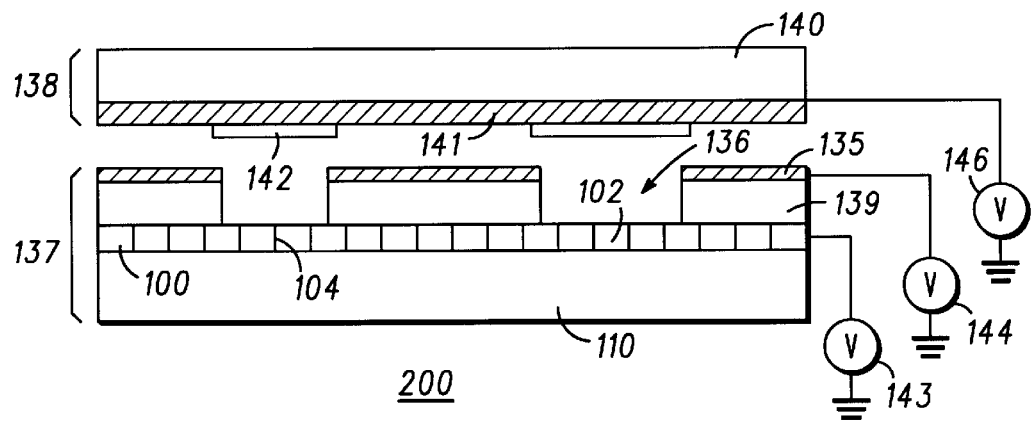
FIG. 4 is a cross-sectional view of a preferred embodiment of a field emission device fabricated in accordance with the method of the invention.

FIG. 4 is a cross-sectional view of a preferred embodiment of a field emission device (FED) 200 fabricated in accordance with the method of the invention. Although FIG. 4 illustrates a display device, the scope of the invention is not limited to the fabrication of displays. Rather, the invention can be practiced in the fabrication of other types of field emission devices, such as microwave power amplifier tubes, ion sources, matrix-addressable sources of electrons for electron-lithography, and the like.

As illustrated in FIG. 4, FED 200 includes a cathode plate 137 and an anode plate 138. In accordance with the method of the invention, cathode plate 137 is fabricated by performing upon the structure of FIG. 3 the additional step of etching conductive layer 134 and dielectric layer 132 to define an emitter well 136 and to expose electron-emissive film 100. This additional step also results in the formation of a gate extraction electrode 135 and a dielectric spacer 139.

Anode plate 138 is disposed to receive electrons emitted by electron-emissive film 100. Anode plate 138 includes a transparent substrate 140 made from, for example, glass. An anode 141 is disposed on transparent substrate 140. Anode 141 is preferably made from a transparent conductive material, such as indium tin oxide. A phosphor 142 is disposed upon anode 141. Phosphor 142 is cathodoluminescent and emits light upon activation by electrons. Methods for fabricating anode plates for matrix-addressable FED's are known to one of ordinary skill in the art.

As further illustrated in FIG. 4, a first voltage source 143 is connected to electron-emissive film 100, for applying a cathode voltage thereto; a second voltage source 144 is connected to gate extraction electrode 135, for applying a gate voltage thereto; and a third voltage source 146 is connected to anode 141, for applying an anode voltage thereto. During the operation of FED 200, the cathode voltage, the gate voltage, and the anode voltage are selected to control electron emission from electron-emissive film 100 and to attract the electrons toward phosphors 142.

Figure 5:
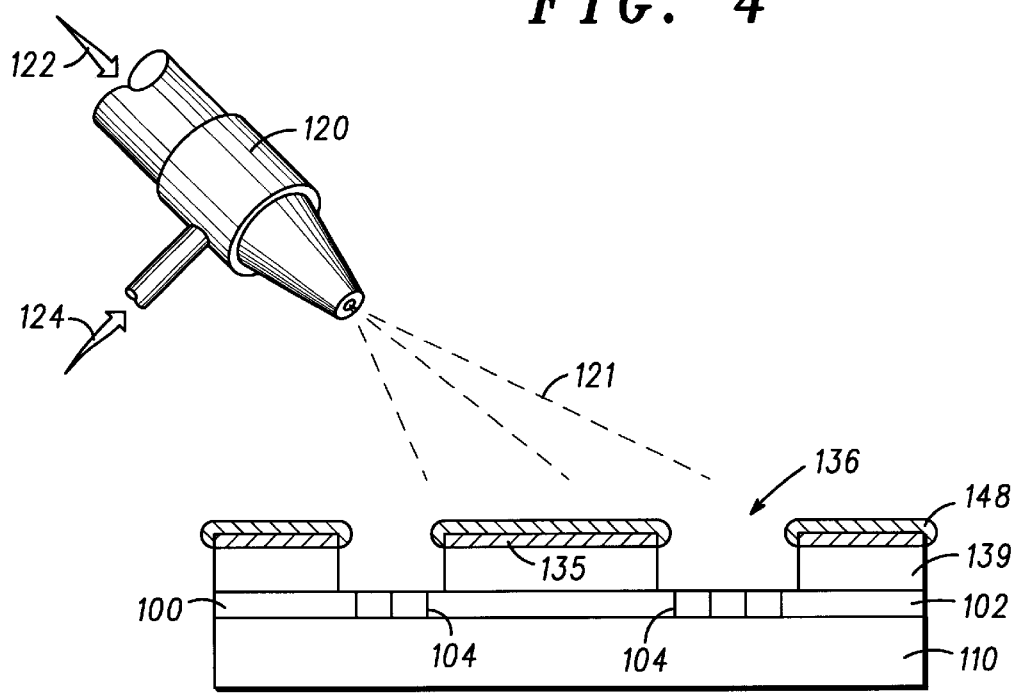
FIG. 5 is a cross-sectional view of a structure realized during the fabrication of another embodiment of a field emission device, in accordance with the method of the invention.

FIG. 5 is a cross-sectional view of a structure realized during the fabrication of another embodiment of a field emission device, in accordance with the method of the invention. The example of FIG. 5 differs from that of FIGS. 3 and 4 in that the step of dry spraying powder 124 onto substrate 102 is performed subsequent to the formation of emitter wells 136.

Thus, the structure illustrated in FIG. 5 is realized by first providing substrate 102 on back plate 110. Substrate 102 is made in the manner described with reference to FIG. 1 or FIG. 2. Thereafter, dielectric layer 132 is deposited on substrate 102, and conductive layer 134 is deposited on dielectric layer 132. Next, conductive layer 134 and dielectric layer 132 are etched to define emitter wells 136 and to expose substrate 102. The etch step also results in the formation of gate extraction electrode 135 and dielectric spacer 139.

Subsequent to the formation of emitter wells 136, and in accordance with the method of the invention, a lift-off layer 148 is deposited on gate extraction electrode 135. Lift-off layer 148 is made by depositing an evaporated metal at an acute angle with respect to a plane defined by gate extraction electrode 135, so that the evaporated metal is not deposited on substrate 102. Preferably, lift-off layer 148 is made from aluminum.

Subsequent to the deposition of lift-off layer 148, and in accordance with the method of the invention, powder 124 is dry sprayed onto substrate 102. In contrast to the example of FIGS. 3 and 4, the dry spraying step of the example of FIG. 5 results in the deposition of emissive material 104 only at the exposed portions of substrate 102, within emitter wells 136. Thereafter, lift-off layer 148 is removed, thereby realizing another embodiment of a cathode plate for use in a field emission device. If lift-off layer 148 is made from aluminum, lift-off layer 148 is preferably removed with an aqueous solution of hydrogen chloride.

In summary, the invention is for a method for fabricating an electron-emissive film and a field emission device having the electron-emissive film. The method of the invention includes the step dry spraying a powder, which includes an emissive material, onto a substrate. The parameters of the dry spraying are selected so that the emissive material is anchored to the substrate upon deposition. They are also selected so that aggregates or agglomerates of the emissive material are broken apart to facilitate uniform deposition of the emissive material onto the surface of the substrate. The method of the invention can be performed in air and does not require vacuum conditions. If the emissive material is a carbon nanotube, and in contrast to a potential consequence of a liquid deposition, the dry spraying can facilitate a vertical, rather than a horizontal orientation, of the deposited nanotubes. The method of the invention further provides the benefit of uniformity of the electron-emissive film, which results in uniform emission properties.

While we have shown and described specific embodiments of the present invention, further modifications and improvements will occur to those skilled in the art. For example, the substrate of the invention can be non-conductive.

We desire it to be understood, therefore, that this invention is not limited to the particular forms shown, and we intend in the appended claims to cover all modifications that do not depart from the spirit and scope of this invention.

What is claimed is:

1. A method for fabricating an electron-emissive film comprising the steps of:
   providing a powder having an emissive material including a plurality of carbon nanotubes;
   providing a substrate; and
   dry spraying the powder onto the substrate.

2. The method for fabricating an electron-emissive film as claimed in claim 1, wherein each of the plurality of carbon nanotubes has a length-wise axis, wherein the substrate defines a surface, and wherein the step of dry spraying the powder onto the substrate comprises the steps of:
   providing a spray nozzle characterized by a nozzle pressure;
   propelling the powder through the spray nozzle, thereby defining a spray;
   disposing the spray nozzle to define a separation distance from the surface of the substrate and to further define a spray angle between the spray and the surface of the substrate; and
   selecting the nozzle pressure, the separation distance, and the spray angle so that upon deposition the length-wise axis of each of the plurality of carbon nanotubes is about perpendicular to the surface of the substrate.

3. The method for fabricating an electron-emissive film as claimed in claim 1, wherein the step of providing a substrate comprises the step of providing a wet sol gel.

4. The method for fabricating an electron-emissive film as claimed in claim 3, wherein the step of providing a wet sol gel comprises the step of providing a wet sol gel that dries to define a conductor.

5. The method for fabricating an electron-emissive film as claimed in claim 1, wherein the step of providing a substrate comprises the step of providing a substrate having a surface defining a plurality of interstices, thereby depositing the emissive material in the plurality of interstices during the step of dry spraying the powder onto the substrate.

6. The method for fabricating an electron-emissive film as claimed in claim 1, wherein the step of providing a substrate comprises the step of providing a substrate having a columnar microstructure.

7. The method for fabricating an electron-emissive film as claimed in claim 1, wherein the step of providing a substrate comprises the step of providing a porous metal.

8. The method for fabricating an electron-emissive film as claimed in claim 7, wherein the step of providing a porous metal comprises the step of providing a porous aluminum.

9. The method for fabricating an electron-emissive film as claimed in claim 1, further comprising subsequent to the step of dry spraying the powder onto the substrate the step of removing loose powder from the substrate.

10. The method for fabricating an electron-emissive film as claimed in claim 1, wherein the substrate defines a surface, and wherein the step of dry spraying the powder onto the substrate comprises the steps of:
   providing a spray nozzle characterized by a nozzle pressure;
   propelling the powder through the spray nozzle, thereby defining a spray;

disposing the spray nozzle to define a separation distance from the surface of the substrate and to further define a spray angle between the spray and the surface of the substrate; and selecting the nozzle pressure, the separation distance, and the spray angle to provide uniformity of the electron-emissive film.

11. The method for fabricating an electron-emissive film as claimed in claim 10, wherein the step of providing a powder having an emissive material comprises the step of providing a powder having carbon nanotubes; wherein the step of propelling the powder through the spray nozzle comprises the step of propelling the powder with nitrogen gas; and wherein the step of selecting the nozzle pressure, the separation distance, and the spray angle comprises the step of providing a nozzle pressure equal to about $3.45 \times 10^5$ Pascals, a separation distance equal to about 10 centimeters, and a spray angle equal to about 90 degrees.

12. The method for fabricating an electron-emissive film as claimed in claim 1, wherein the substrate defines a surface, and wherein the step of dry spraying the powder onto the substrate comprises the steps of:

providing a spray nozzle characterized by a nozzle pressure;

propelling the powder through the spray nozzle, thereby defining a spray;

disposing the spray nozzle to define a separation distance from the surface of the substrate and to further define a spray angle between the spray and the surface of the substrate; and selecting the nozzle pressure, the separation distance, and the spray angle to cause adhesion of the emissive material to the substrate.

13. The method for fabricating an electron-emissive film as claimed in claim 12, wherein the step of providing a powder having an emissive material comprises the step of providing a powder having carbon nanotubes; and wherein the step of selecting the nozzle pressure, the separation distance, and the spray angle comprises the step of providing a nozzle pressure equal to about $3.45 \times 10^5$ Pascals, providing a separation distance equal to about 10 centimeters, and providing a spray angle equal to about 90 degrees.

14. The method for fabricating an electron-emissive film as claimed in claim 13, wherein the step of propelling the powder through the spray nozzle comprises the step of propelling the powder with nitrogen gas.

15. The method for fabricating an electron-emissive film as claimed in claim 1, wherein the substrate defines a surface, wherein the step of providing a powder having an emissive material comprises the step of providing a powder having a plurality of aggregates of carbon nanotubes, and wherein the step of dry spraying the powder onto the substrate comprises the steps of:

providing a spray nozzle characterized by a nozzle pressure;

propelling the powder through the spray nozzle, thereby defining a spray;

disposing the spray nozzle to define a separation distance from the surface of the substrate and to further define a spray angle between the spray and the surface of the substrate; and selecting the nozzle pressure, the separation distance, and the spray angle so that the plurality of aggregates of carbon nanotubes are broken down and so that the emissive material is deposited on the substrate substantially as individually isolated carbon nanotubes.

16. The method for fabricating an electron-emissive film as claimed in claim 15, wherein the step of providing a powder having an emissive material comprises the step of providing a powder having an emissive material and further having a silicon carbide.

17. A method for fabricating a field emission device comprising the steps of:

providing a powder having an emissive material;

providing a substrate;

dry spraying the powder onto the substrate, thereby forming an electron-emissive film;

thereafter, depositing a dielectric layer on the electron-emissive film;

depositing a conductive layer on the dielectric layer; and etching the conductive layer and the dielectric layer to define an emitter well and to expose the electron-emissive film, thereby forming a gate extraction electrode and further forming a dielectric spacer.

18. A method for fabricating a field emission device comprising the steps of:

providing a substrate;

depositing a dielectric layer on the substrate;

depositing a conductive layer on the dielectric layer;

etching the conductive layer and the dielectric layer to define an emitter well and to expose the substrate, thereby forming a gate extraction electrode and further forming a dielectric spacer;

depositing a lift-off layer on the gate extraction electrode;

providing a powder having an emissive material;

dry spraying the powder onto the substrate; and thereafter, removing the lift-off layer.

19. The method for fabricating a field emission device as claimed in claim 18, wherein the step of depositing a lift-off layer comprises the step of depositing an aluminum layer on the gate extraction electrode, and wherein the step of removing the lift-off layer comprises the step of removing the aluminum layer with an aqueous solution of hydrogen chloride.

* * * * *